(12) United States Patent
Ishizaki et al.

(10) Patent No.: US 11,004,582 B2
(45) Date of Patent: May 11, 2021

(54) MOLDED PRODUCT OF MAGNETIC POWDER COMPOSITION COMPRISING MAGNETIC POWDER OF SURFACE-TREATED MAGNETITE PARTICLES, AND METHODS OF PRODUCING THEREOF

(71) Applicant: Somar Corporation, Chuo-ku (JP)

(72) Inventors: Hirohisa Ishizaki, Soka (JP); Akira Ochiai, Soka (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 14/905,292

(22) PCT Filed: Jul. 17, 2014

(86) PCT No.: PCT/JP2014/069101
§ 371 (c)(1),
(2) Date: Jan. 15, 2016

(87) PCT Pub. No.: WO2015/008842
PCT Pub. Date: Jan. 22, 2015

(65) Prior Publication Data
US 2016/0163437 A1    Jun. 9, 2016

(30) Foreign Application Priority Data
Jul. 18, 2013   (JP) .............................. JP2013-149821

(51) Int. Cl.
*B05D 7/00* (2006.01)
*H01F 1/28* (2006.01)
(Continued)

(52) U.S. Cl.
CPC .............. *H01F 1/28* (2013.01); *B22F 1/0018* (2013.01); *B22F 1/0062* (2013.01); *C01G 49/08* (2013.01);
(Continued)

(58) Field of Classification Search
CPC .............. Y10T 428/25; Y10T 428/254; Y10T 428/256; Y10T 428/257; Y10T 428/2995;
(Continued)

(56) References Cited

U.S. PATENT DOCUMENTS 4,076,890 A * 2/1978 Yamada ................. G11B 5/712
                                                    428/323
2008/0003159 A1* 1/2008 Cheon .................... B82Y 25/00
                                                    423/263
(Continued)

FOREIGN PATENT DOCUMENTS

CN         102194562 A      9/2011
CN         102884595 A      1/2013
(Continued)

OTHER PUBLICATIONS

Hanemann et al, Polymer-nanoparticle composites: from synthesis to modern applications, Materials 2010, 3, 3468-3517 (Year: 2010).*
(Continued)

*Primary Examiner* — Hoa (Holly) Le
(74) *Attorney, Agent, or Firm* — Thomas|Horstemeyer, LLP

(57) ABSTRACT

A magnetic powder is obtained by removing a dispersion medium from a magnetic fluid that includes magnetic particles, a dispersant and the dispersion medium. A magnetic powder composition includes the magnetic powder and a resin material, and a magnetic powder composition molded body is obtained therefrom. A method of producing a magnetic powder includes removing a dispersion medium from a magnetic fluid containing magnetic particles, a dispersant and the dispersion medium, and powdering a solid component obtained by removing the dispersion medium. A method of producing a magnetic powder com-
(Continued)

position and a method of producing a magnetic powder composition molded product are also provided.

14 Claims, 1 Drawing Sheet

(51) Int. Cl.

| | | |
|---|---|---|
| *C08K 9/04* | (2006.01) | |
| *C01G 49/08* | (2006.01) | |
| *B22F 1/00* | (2006.01) | |
| *C08J 3/20* | (2006.01) | |
| *H01F 1/44* | (2006.01) | |
| *H01F 41/02* | (2006.01) | |

(52) U.S. Cl.
CPC .............. *C08J 3/201* (2013.01); *C08K 9/04* (2013.01); *H01F 1/445* (2013.01); *H01F 41/0266* (2013.01); *B22F 1/0059* (2013.01); *B22F 2998/10* (2013.01); *C01P 2004/61* (2013.01); *C08J 2363/02* (2013.01); *C08K 2201/01* (2013.01); *C22C 2202/02* (2013.01)

(58) Field of Classification Search
CPC ... B01J 2/00; B01J 2/003; B01J 2/006; B01D 1/00; B01D 1/0011; Y10S 428/90
USPC .......................................... 428/402; 977/773
See application file for complete search history.

(56) References Cited

U.S. PATENT DOCUMENTS

2013/0062286 A1* 3/2013 Ruiz Hitzky .......... B82Y 40/00
210/660
2019/0309143 A1* 10/2019 Ishizaki ................... C08K 3/22

FOREIGN PATENT DOCUMENTS

| | | |
|---|---|---|
| GB | 2224020 A | 4/1990 |
| JP | S52-155398 A | 12/1977 |
| JP | S63-150302 A | 6/1988 |
| JP | S63-153201 A | 6/1988 |
| JP | H04-11624 A | 1/1992 |
| JP | H11-506568 | 6/1999 |
| JP | 2003-105067 A | 4/2003 |
| JP | 2011-185920 A | 9/2011 |
| JP | 2013-527594 A | 6/2013 |
| WO | 2010/058801 A1 | 5/2010 |
| WO | 2016104534 A1 | 6/2016 |

OTHER PUBLICATIONS

Wang et al, Sm—Co hard magnetic nanoparticles prepared by surfactant-assisted ball milling, Nanotechnology 2007 18 465701 (Year: 2007).*
Feltin et al., New Technique for Synthesizing Iron Ferrite Magnetic Nanosized Particles, Langmuir 1997, 13, 3927-3933 (Year: 1997).*
Zhu et al, Magnetic Epoxy Resin Nanocomposites Reinforced with Core-Shell Structured Fe@FeO Nanoparticles: Fabrication and Property Analysis, Applied Materials & Interfaces, vol. 2, No. 7, 2100-2107 (2010) (Year: 2010).*
Kim et al., Protective Coating of Superparamagnetic Iron Oxide Nanoparticles, Chem. Mater. 2003, 15, 1617-1627 (Year: 2003).*
Wang et al, Suspensions of Iron Oxide Nanoparticles Stabilized by Anionic Surfactants, J Surfact Deterg (2013) 16:397-407 (Year: 2013).*
Zhao et al, Synthesis of Magnetic Nanoparticles of Fe3O4 and CoFe2O4 and Their Surface Modification by Surfactant Adsorption, Bull. Korean Chem. Soc. 2006, vol. 27, No. 2, (Year: 2006).*
Xie et al., Effect of compounding principles on thermal, mechanical and magnetic performance of soft magnetic polymethylmethacrylate/Fe3O4, Journal of Reinforced Plastics and Composites 32(24) 1928-1933 (2013) (Year: 2013).*
Banert et al., Preparation of highly filled super-paramagnetic PMMA-magnetite nano composites using the solution method, J. Mater Sci 41 (2006) 3051-3056 (Year: 2006).*
Banert & Peuker ("Preparation of highly filled super-paramagnetic PMMA-magnetite nano composites using the solution method", J Mater Sci 41 (2006) 3051-3056) (Year: 2006).*
International Search Report and Written Opinion of Application No. PCT/JP2014/069101 dated Sep. 22, 2014.
Japanese Office Action dated Nov. 14, 2017 for corresponding Japanese Application No. 2015-527338, 14 pages.
Examination Report for GB1600996.1, dated May 31, 2019, pp. 1-5.
Examination Report for GB1600996.1, dated Oct. 4, 2019, pp. 1-2.
Chinese Office Action dated Dec. 26, 2017 to corresponding Chinese Application No. 201480040551.9, 23 pages (w/ partial English Translation).
Yong-Jiang Wei, "Preparation and Consideration of Performances of Magnetic Powder Body and Magnetic Fluid of Nano Fe3O4", Mar. 15, 2004, pp. 4-22.
Notice of Opinion of First Examination dated May 11, 2017 for Chinese Application No. 201480040551.9, and its partial English-language translation.

* cited by examiner

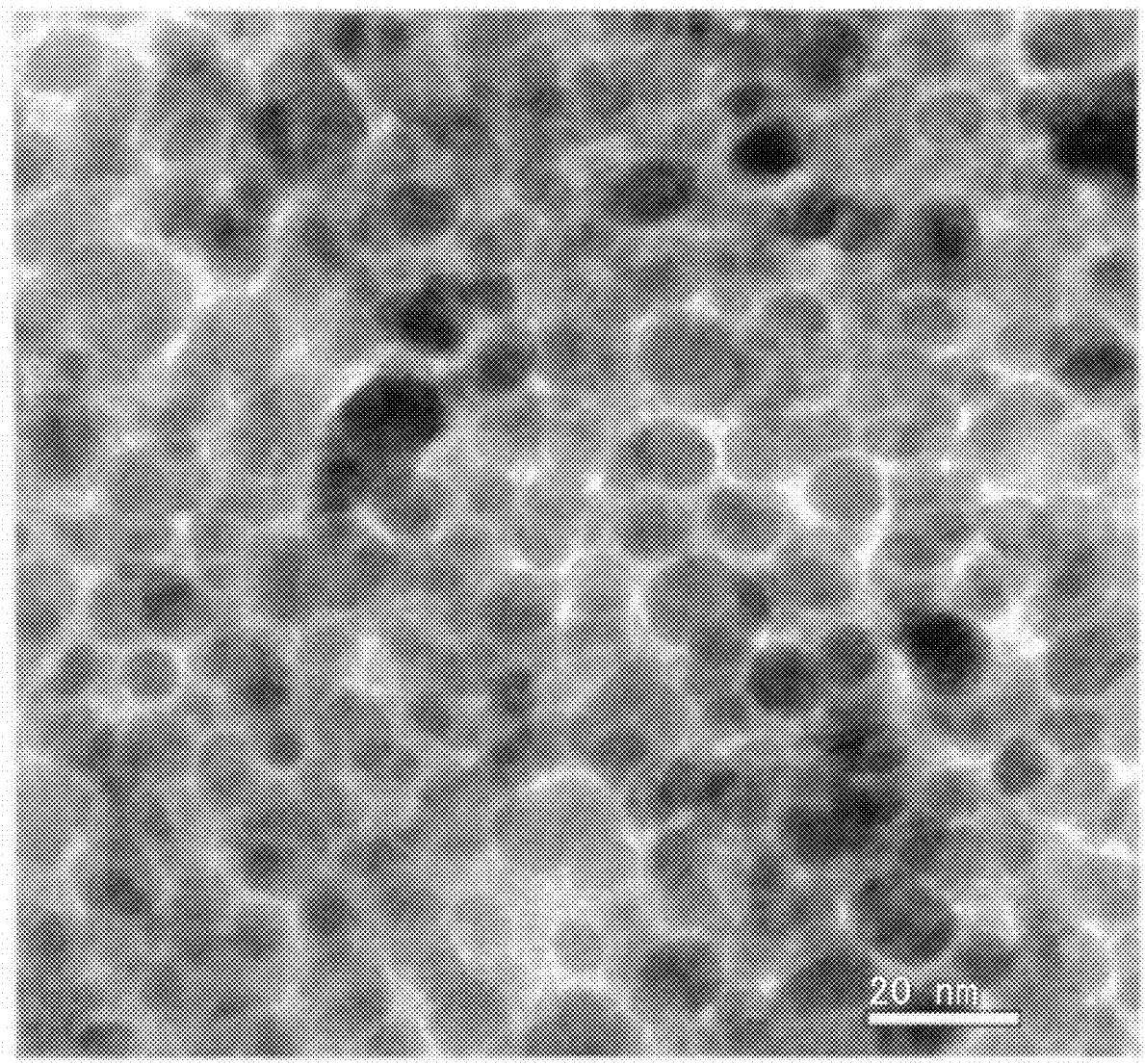

MOLDED PRODUCT OF MAGNETIC POWDER COMPOSITION COMPRISING MAGNETIC POWDER OF SURFACE-TREATED MAGNETITE PARTICLES, AND METHODS OF PRODUCING THEREOF

CROSS-REFERENCE TO RELATED APPLICATIONS

This application is the National Stage of International Application No. PCT/JP2014/069101, filed 17 Jul. 2014, having the title "MAGNETIC POWDER, MAGNETIC-POWDER COMPOSITION, MOLDED OBJECT OF MAGNETIC-POWDER COMPOSITION, AND PROCESSES FOR PRODUCING THE SAME" which claims the benefit of and priority to Japanese Application No. 2013-149821, filed on 18 Jul. 2013, the contents of all of which are incorporated by reference as if fully set forth herein.

TECHNICAL FIELD

The present invention relates to a magnetic powder, a magnetic powder composition, a magnetic powder composition molded product, and methods of producing same.

BACKGROUND ART

In magnetic cores, rectifiers, electric current sensors, and the like, ferrites are widely used as magnetic materials, and, particularly, soft ferrites are used. However, use of ferrites as magnetic materials have problems in, for example, impairment of responses of rectifiers or deterioration of measurement accuracy of electric current sensors, due to an influence from hysteresis resulting from the properties of ferrite materials. Therefore, improvement thereof has been desired.

In recent years, magnetic fluid has attracted attention as a magnetic material free of hysteresis. Magnetic fluid exhibits superparamagnetism imparted by dispersing magnetic powder, such as ferrite particles or magnetite particles, having a particle size in a range of from 3 to 50 nm in a base liquid such as isoparaffin or water. In order to exhibit superparamagnetism, the particle sizes of the magnetic particles need to be nano-order sizes, and, in order to uniformly disperse such magnetic particles in the base liquid, covering of the magnetic particle surface with a surfactant is generally performed.

Magnetic fluid is applied to, for example, electric current sensors. Magnetic fluid has a feature that it has low tendency to cause a problem of magnetic hysteresis, as compared to the case of using solid magnetic bodies. However, when magnetic fluid is applied to, for example, electric current sensors, it is necessary to use, for example, a liquid-impermeable case for confining the magnetic liquid. This necessity imposes a limitation to the range of applications.

In order to deal with this issue, an epoxy resin composition in which minute magnetic particles are contained at a content higher than 70% by mass has been proposed in order to obtain a cured product containing a magnetic material (see, for example, Japanese Patent Application Laid-open (JP-A) No. 2003-105067).

SUMMARY OF INVENTION

Technical Problem

However, as a result of a study made by the inventors of the present application, the inventors have found that it is difficult to uniformly disperse minute magnetic particles in a resin matrix, and that there is a problem in that a high quality cured product is not obtained due to occurrence of inhibition of curing, or in that the obtained cured product does not exhibit magnetic properties comparable to those achieved using magnetic fluid.

The present invention has been made in consideration of the problems of the conventional techniques described above. An object of the present invention is to provide a magnetic powder, a magnetic powder composition and a magnetic powder composition molded body which have excellent usability and in which excellent magnetic properties of magnetic fluid have not been deteriorated, and methods of producing same.

Solution to Problem

The inventors have earnestly carried out a study in view of the problems of the conventional techniques, and have found that, in a magnetic powder obtained by removing a dispersion medium from a magnetic fluid, at least a part of the surface thereof is covered with an organic matter, and a molded product obtained using the magnetic powder can achieve the object. Thus, the inventor has completed the invention.

Specifically, configurations according to the invention are described below.

<1> A magnetic powder obtained by removing a dispersion medium from a magnetic fluid that includes magnetic particles, a dispersant and the dispersion medium.

<2> The magnetic powder according to <1>, in which the average primary particle size of the magnetic particles covered with the dispersant is from 5 nm to 50 nm.

<3> The magnetic powder according to <1> or <2>, in which the dispersant is a surfactant.

<4> A magnetic powder composition including the magnetic powder of any one of <1> to <3> and a resin material.

<5> A magnetic powder composition molded product obtained by molding the magnetic powder composition of <4>.

<6> A method of producing a magnetic powder, the method including a process of removing a dispersion medium from a magnetic fluid containing magnetic particles, a dispersant and the dispersion medium, and a process of powdering a solid component obtained by removing the dispersion medium.

<7> The method of producing a magnetic powder according to <6>, in which the process of removing the dispersion medium from the magnetic fluid includes a process of adding a coagulating component to the magnetic fluid, to coagulation-precipitate the solid component containing the magnetic particles, and a process of removing residual dispersion medium from the coagulation-precipitated solid component.

<8> A method of producing a magnetic powder composition, the method including a process of mixing a resin material with the magnetic powder obtained by the method of <6> or <7>, to obtain a mixture containing the magnetic powder and the resin material.

<9> A method of producing a magnetic powder composition molded product, the method including molding the magnetic powder composition obtained by the method of <8>, to obtain a magnetic powder composition molded product.

Although the mechanism working in the invention is not clearly understood, we presume that the mechanism is as follows.

Dispersing of a minute magnetic material, which exerts excellent magnetic properties, in a resin matrix often causes aggregation. However, in the present invention, a magnetic fluid is prepared, a dispersion medium in the magnetic fluid is removed to separate a solid component containing the magnetic material, and the solid component is powdered. Therefore, at least a part of the surface of the resultant magnetic powder is covered with a dispersant (preferably a surfactant) contained in the magnetic fluid. Since the magnetic particles according to the invention have a surface at least a part of which is covered with a dispersant (preferably a surfactant), oxidation thereof as a powder is suppressed in the atmospheric air, and handling thereof is easy. Here, the magnetic material in the magnetic fluid is present as a superparamagnetic material. Therefore, although magnetic powder obtained by powdering of the magnetic fluid as a starting material is apparently an aggregated body, the magnetic powder does not re-aggregate when the size thereof is nano-order, and the powering is performed while the superparamagnetic state is maintained. This seems to be a reason why the magnetic powder has excellent magnetic properties.

We presume that, in a case in which a molded product is prepared using a magnetic powder composition containing the magnetic powder according to the invention and a resin material under process conditions suitable for the resin material used, the resultant molded product has magnetic properties comparable to those achieved by using a magnetic fluid, due to the effects described above.

Advantageous Effects

According to the invention, a magnetic powder, a magnetic powder composition and a magnetic powder composition molded body which have excellent usability and in which excellent magnetic properties of magnetic fluid have not been deteriorated, and methods of producing same, can be provided.

BRIEF DESCRIPTION OF THE DRAWING

FIG. 1 is a transmission electron microscope (TEM) image of a molded body of Example 1.

EMBODIMENTS FOR CARRYING OUT INVENTION

Hereinafter, embodiments of the invention are described in detail. However, the explanation of constituent elements described below is one example (a representative example) of embodiments of the invention, and the embodiments are not limited to the contents of the explanation. The invention may be practiced with various modifications within the scope of the gist of the invention.

In the present specification, each numerical range expressed by " . . . to . . . " indicates a range including the numbers noted before and after "to" as the minimum and maximum values. As used herein, the scope of each substituent mentioned includes unsubstituted forms thereof and forms having a further substituent, unless specified otherwise. For example, the expression "alkyl group" as used herein is intended to encompass unsubstituted alkyl groups as well as alkyl groups having a further substituent. The same shall apply to other substituents.

[Magnetic Powder]

Hereinafter, the magnetic powder, magnetic powder composition and magnetic powder composition molded product according to the invention are described in detail with reference to processes 1 to 5 in a method of producing a magnetic powder composition molded product.

The magnetic powder according to the invention means a magnetic powder exhibiting superparamagnetism and obtained by removing a dispersion medium from a magnetic fluid containing the dispersion medium and magnetic particles of which at least a part of the surface thereof is covered with a dispersant. As used herein, the term "superparamagnetism" means an aggregate of fine particles of a ferromagnetic substance which aggregate does not exhibit hysteresis and does not have remanent magnetization, and superparamagnetism exhibits 100-fold to 100,000-fold higher atomic magnetic moment than that of paramagnetism.

[1. Preparation of Magnetic Fluid]

A magnetic fluid is a colloidal solution in which magnetic particles are dispersed in a dispersion medium, and, since the dispersibility thereof is excellent. solid-liquid separation such as precipitation or separation due to, for example, the gravitational force or a magnetic field does not occur, and the magnetic fluid can be regarded as a uniform liquid having its own magnetism.

The magnetic fluid to be used in the invention may be prepared, as appropriate, or a commercially available product may be used as the magnetic fluid. Examples of the commercially available product include EXP series, P series, APG series, and REN series, all of which are tradenames and manufactured by Ferrotec Corporation.

When a magnetic fluid is prepared, methods for preparing the magnetic fluid can be classified into methods of reducing the sizes of macroscopic magnetic particles into colloidal sizes, and methods of condensing atoms or ions to obtain magnetic fine particles. Examples of the former methods include a pulverization method and a spark erosion method. Examples of the latter methods include a chemical coprecipitation method (wet method), a method of thermally decomposing a metal carbonyl, and a vacuum deposition method. In the invention, a chemical coprecipitation method is preferable due to excellent productivity achieved thereby.

A method of preparing a magnetic fluid by using a chemical precipitation method is, for example, a method including adding sodium oleate to a magnetite water slurry prepared from a ferrous sulfate aqueous solution and a ferric sulfate aqueous solution to cause oleate ions to be adsorbed on the surface of magnetite particles, followed by washing with water, drying, and then dispersing in an organic solvent.

The magnetic fluid used in the invention includes magnetic particles, a dispersant and a dispersion medium. Each component is described in detail below.

(Magnetic Particles)

Examples of the magnetic particles used in the invention include: ferromagnetic oxides such as magnetite, γ-ferric oxide, manganese ferrite, cobalt ferrite, or a composite ferrite of any of these with zinc and/or nickel, or barium ferrite; ferromagnetic metals such as iron, cobalt and rare earth elements; and metal nitrides. Among them, magnetite is preferable from the viewpoint of mass producibility.

The magnetic particles for use in the invention are used without particular limitations as long as the magnetic particles have an average particle size within a range in which supermagnetism can be exhibited, i.e., an average particle size that is not greater than the critical particle size. For example, in the case of magnetite or γ-ferric oxide, the average particle size is preferably 50 nm or less, and particularly preferably in the range of from 10 nm to 40 nm.

The average particle size of the magnetic particles is an average primary particle size as measured by a dynamic light scattering method.

From the viewpoint of mass producibility, the content of magnetic particles contained in the magnetic fluid is preferably from 30% by mass to 70% by mass, and more preferably from 40% by mass to 60% by mass, in terms of solid content. Here, the "in terms of solid content" refers to the content of magnetic particles after calcination relative to the total mass.

(Dispersant)

The dispersant is added in order to improve the dispersibility of the magnetic particles in the dispersion medium. Known surfactants, polymeric dispersants and the like may be used, as appropriate, as the dispersant. In particular, surfactants are preferable from the viewpoints of dispersibility and the performance of the resultant magnetic powder.

Inclusion of the magnetic particles and the dispersant in the magnetic fluid causes at least a portion of the amount of the dispersant to attach to the magnetic particles, whereby at least a part of the surface of the magnetic particles is covered with a dispersant, preferably a surfactant. This enables the magnetic particles to be stably dispersed in the dispersion medium since hydrophilic groups of the surfactant are adhered toward the surface of the magnetic particles whereas hydrophobic groups thereof are oriented toward the dispersion medium. Examples of surfactants that can be used as the dispersant in the invention include: anionic surfactants, which are hydrocarbon compounds having a polar group such as a carboxyl group, a hydroxyl group or a sulfonic acid group, for example, oleic acid or a salt thereof, a petroleum sulfonic acid or a salt thereof, a synthetic sulfonic acid or a salt thereof, eicosyl naphthalene sulfonic acid or a salt thereof, polybutene succinic acid or a salt thereof, and erucic acid or a salt thereof; nonionic surfactants, for example, polyoxyethylene nonyl phenyl ether; and amphoteric surfactants having both a cationic moiety and an anionic moiety in the molecular structures thereof, such as alkyl diamino ethyl glycine. Among them, sodium oleate is preferable due to its low price and easy availability.

The dispersant may be used singly, or in combination of two or more thereof. The content of dispersant (when two or more dispersants are contained, the total content thereof) in the magnetic fluid may be an amount with which aggregation between magnetic particles can be prevented, and is more preferably from 5% by mass to 25% by mass, particularly preferably from 10% by mass to 20% by mass, in terms of solid content.

(Magnetic Particles Covered with Dispersant)

In the magnetic fluid, a dispersant is adhered on the magnetic particles, as a result of which at least a part of the surface of the magnetic particles is covered with a dispersant. Magnetic particles in this state are referred to as "magnetic particles covered with a dispersant". From the viewpoint of preventing aggregation of magnetic particles, it is preferable that a dispersant of about 1 nm to about 5 nm is adsorbed on the surface of the magnetic particles, and it is more preferable that a dispersant of about 2 nm to about 3 nm is adsorbed on the surface of the magnetic particles.

The average particle size of the magnetic particles covered with a dispersant in a case in which the magnetic particles are made of magnetite or γ-ferric oxide is preferably 55 nm or less, and particularly preferably in the range of from 11 nm to 45 nm, in consideration of the average particle size of the magnetic particles described above. The average particle size of the magnetic particles covered with a dispersant refers to an average primary particle size.

The average particle size of the magnetic particles refers to the average particle size of the magnetic particles covered with a dispersant (such as a surfactant), unless specified otherwise. Here, the average particle size of the magnetic particles is a value as measured by a dynamic light scattering method using a nano particle analyzer NANO PARTICA SZ-100 series manufactured by Horiba Ltd.

From the viewpoint of preventing aggregation between the magnetic particles, the content of the dispersant (when two or more dispersants are contained, the total content thereof) in the magnetic fluid is preferably from 5% by mass to 25% by mass, and more preferably from 10% by mass to 20% by mass, in terms of solid content.

(Dispersion Medium)

The dispersion medium of the magnetic fluid in the invention is not particularly limited as long as it is in the liquid state at room temperature and the magnetic particles can be dispersed therein. At least one selected from the group consisting of water, organic solvents, and the like is used as the dispersion medium.

Examples of organic solvents include: hydrocarbons having a molecular weight of not more than 5000, such as polyolefins, isoparaffin, heptane and toluene; esters such as polyol esters; and silicone oils. A mixture of plural kinds of organic solvents may be used as long as the compatibility therebetween is favorable.

Water, or a mixture of water and a water-soluble organic solvent, can preferably be used. Examples of water-soluble organic solvents include ethanol and methanol. When water is used as a dispersant, pure water or ion exchange water, in which the content of impurities is small, is preferably used.

The concentration of each component relative to the dispersion medium is not particularly limited. Nevertheless, from the viewpoint of, for example, processability in subsequent processes, the amount of the dispersion medium is preferably such that the solid matter concentration as a total of the respective components described above is in the range of from 30% by mass to 90% by mass, more preferably in the range of from 60% by mass to 80% by mass.

In the solid component, the ratio of the total content of the magnetic particles (inorganic components) to the total content of organic components such as a dispersant typified by a surfactant is not particularly limited as long as it is within a range in which superparamagnetism is exhibited. Nevertheless, in general, the mass ratio of the magnetic particles to the dispersant is preferably from 60:40 to 90:10, and more preferably in the range of from 70:30 to 85:15.

The ratio of the content of inorganic components to the content of organic components in the magnetic fluid can be determined by differential heat capacity measurement. The content of each component in the specification is a value as measured using an EXSTAR6000TG/DTA manufactured by Seiko Instruments Inc.

(Other Components)

In the magnetic fluid, in addition to the magnetic particles, the dispersant and the dispersion medium, various other components may further be included in accordance with the purpose, within a range in which the effects of the invention are not impaired.

Examples of other components include pH controlling agents such as potassium hydroxide and triethylamine. Inclusion of a pH controlling agent enables the control of the size of the magnetic particles.

[2. Removal of Dispersion Medium from Magnetic Fluid]

In this process, the dispersion medium is removed from the magnetic fluid, thereby obtaining a solid component that includes magnetic particles of which at least a part is covered with a dispersant.

Methods employed for removing the dispersion medium are not particularly limited. Examples thereof include: a method including adding a coagulating component to the magnetic fluid, to coagulation-precipitate the magnetic particles contained in the magnetic fluid, and removing the dispersion medium, which is present as the supernatant; a method including separating the solid component by filtering using a filter or filter paper having an appropriate opening; a method including performing heating at a temperature that is equal to or higher than the boiling point of the dispersion medium, to remove the dispersion medium by evaporation; a method involving centrifugation, the method including applying a centrifugal force to the magnetic fluid, to separate the magnetic particles covered with a dispersant and contained in the magnetic fluid; and a method including performing separation using a magnet.

In this process, there are cases in which residual dispersant and the like that do not attach to the magnetic particles are also removed together with the dispersion medium.

In the present invention, magnetic particles covered with a dispersant are obtained using the magnetic fluid as described above. In contrast, since the magnetic powder is extremely small, it is extremely difficult to obtain a covered magnetic powder capable of exerting the effects of the invention, even when the surface of a magnetic fluid is processed to be covered with an organic material using a usual covering method, such as an electrostatic contact method or a spray method.

In particular, a method of coagulation-precipitating the magnetic particles is preferable from the viewpoints of separation efficiency and safety. This method is described in detail below.

In the present embodiment, first, a coagulating component is added to the magnetic fluid, thereby coagulation-precipitating the magnetic particles contained in the magnetic fluid. The method employed for the coagulation-precipitating is, for example, a method including adding a solvent containing an alcohol, more particularly ethanol, as a coagulating component in a case in which isoparaffin is used as an organic solvent that is the dispersion medium of the magnetic fluid. Adding a coagulating component followed by stirring causes uniformly dispersed magnetic particles to aggregate with one another, to precipitate. The ethanol may be pure ethanol, or alternatively an ethanol aqueous solution having a concentration of 80% by mass or higher.

In order to stably precipitate the magnetic particles through stirring, the duration of precipitation in the present process is preferably from about 1 hour to about 36 hours, and more preferably from about 20 hours to about 28 hours, when the temperature is room temperature (25° C.).

In this process, the precipitation of the particles is preferably performed using an organic solvent, such as an alcohol, as a coagulating component. It is preferable that co-precipitating agents or the like, which are usually used for causing efficient particle aggregation, are not used, because the co-precipitating agents or the like themselves have electric conductivity, and may influence the magnetic properties of the magnetic powder or cured product to be obtained.

[3. Production of Magnetic Powder]

In the process of removing the dispersion medium, it is preferable to remove the dispersion medium, and heat the solid component that contains magnetic particles covered with a dispersant and that has been separated from the dispersion medium, thereby further reducing the amount of residual solvent. In the process, if the solid component has aggregated, the solid component is re-powdered, to obtain a magnetic powder.

First, the solid component, such as a coagulation-precipitate, is further filtered, thereby separating alcohol and/or residual dispersion medium therefrom, and the resultant is heated. Since rapid heating to a high temperature may cause uneven drying of the magnetic particles and/or scattering of the magnetic particles due to rapid volume expansion of alcohol remaining between the magnetic particles. Therefore, the drying temperature is preferably in the range of from 70° C. to 200° C., and more preferably in the range of from 100° C. to 150° C. A two-stage drying process may be adopted in which initial drying is performed in the temperature range of from 60° C. to 80° C. for about 1 hour and then the temperature is increased to the temperature range of from 100° C. to 150° C.

Wth respect to the drying apparatus, a method including placing the solid component in a convection oven in which the temperature has been raised to a preset temperature, to dry the solid component, a method including adding the solid component into a rotary kiln, to dry the solid component, and the like are preferable. The drying time is preferably from 5 hours to 10 hours, and more preferably from about 6 hours to about 9 hours. After heating, the solid component is cooled by being left to stand, and drying is finished thereby. The cooling may be performed for a duration of from about 1 hour to about 2 hours.

The presence of residual solvent makes the surface of the magnetic particles to be tacky; therefore, drying is preferably performed to a degree at which the tackiness is no longer sensed when touched with fingers.

After drying, the stage proceeds to the process of powdering the solid component, and the solid component that has aggregated in the previous process is re-powdered. The re-powdering is performed, for example, by pulverizing the aggregated solid component, and the powder obtained by the powdering is used as the magnetic powder according to the invention.

In the case of performing pulverization, a silane coupling agent is preferably uniformly sprayed onto the surface of the particles after drying that is in the dry state prior to pulverizing. The silane coupling agent is adsorbed on the surface of the magnetic particles, and can improve the adhesion to the resin material described below.

With respect to silane coupling agents that can be used in the invention, known silane coupling agents that have a functional group capable of being adsorbed on the magnetic particles may be used, as appropriate.

Examples of the silane coupling agent include KBM-403 (tradename) manufactured by Shin-Etsu Chemical Co. Ltd. The silane coupling agent may be used singly, or in combination of two or more thereof. The amount of the silane coupling agent to be added is preferably from 0.5 parts by mass to 1.5 parts by mass with respect to 100 parts by mass of the dry particles.

The pulverization is preferably performed using a known pulverization apparatus that can apply a compression stress or a shear stress, such as a cutter mixer or HENSCHEL mixer. Pulverization that applies a sliding stress, such as by using a mortar or a mill, is not preferable since the magnetic properties of the magnetic powder to be obtained are affected thereby.

In this manner, the magnetic powder according to the invention is obtained. In the magnetic powder according to the invention, at least a part of the surface of the magnetic particles is covered with an organic component, such as a dispersant originally contained in the magnetic fluid and/or an optionally added silane coupling agent.

The presence of an organic component on the surface of the magnetic particles can be confirmed by, for example, differential thermal analysis.

[Magnetic Powder Composition]

The magnetic powder composition according to the invention includes at least the magnetic powder according to the invention and a resin material. The magnetic powder composition according to the invention is prepared through a process of mixing the magnetic powder obtained by the above-described processes and a resin material to obtain a mixture of the magnetic powder and the resin material. The magnetic powder composition obtained is useful for the production of a molded product.

[4. Preparation of Mixture of Magnetic Powder and Resin Material]

The magnetic powder according to the invention prepared as described above and a resin material are mixed to obtain a mixture of the magnetic powder and the resin material, whereby a magnetic powder composition is obtained.

The resin material contained in the magnetic powder composition is used as a moldable resin material for use in the preparation of a magnetic powder composition molded product.

(Resin Material)

The resin material is not particularly limited, and may be selected, as appropriate, from thermoplastic resins or thermosetting resins in accordance with the intended uses of the magnetic powder composition and the molded product.

In particular, from the viewpoint of durability, thermosetting resins are preferable in the case of use as an element such as a rectifier or an electric current sensor. Typical examples of resin materials that can be used in the invention include thermosetting resins such as epoxy resins, phenol resins, melamine resins, polyimide resins, urea resins, unsaturated polyester resins, polyurethane resins, and silicone resins, and thermoplastic resins such as acrylic resins, polyethylene resins, polypropylene resins, polyvinyl chloride resins, polyvinyl acetate resins, acrylonitrile butadiene styrene copolymer resins, and fluororesins. One resin, or two or more resins, may be appropriately selected and used in accordance with the intended use of the molded product.

The preparation of the mixture is performed by stirring together the magnetic powder and a resin material in the powder or pellet state. From the viewpoint of further improving the homogeneity of the mixture, it is preferable to add a resin material in the powder or pellet state to the magnetic powder, and melt-kneading the mixture in a single screw extruder. The temperature and kneading time of the melt-kneading may be appropriately adjusted in accordance with the resin material to be used.

From the viewpoint of uniform mixing, it is more favorable to mix the magnetic powder with a resin material in the solid state such as a powder state or a pellet state, increasing the temperature of the mixture, and melt-kneading the mixture, than pouring the magnetic powder according to the invention into an already-melted resin material.

The mixing ratio between the resin material and the magnetic powder is appropriately selected in accordance with the desired molded product. In general, it is preferable to mix from 20 parts by mass to 70 parts by mass of resin material with 100 parts by mass of magnetic powder.

(Other Components)

In addition to the magnetic powder and the resin material, various components may further be included in the magnetic powder composition in accordance with the purpose, within a range in which the effects of the invention are not impaired. Examples thereof include cross-linking agents, curing accelerators, release agents, foaming agents and fillers.

Cross-linking agents are not particularly limited, and cross-linking agents that can form cross-links with thermosetting resins may be used, as appropriate. Examples thereof include imidazole-based cross-linking agents, urea-based cross-linking agents and triphenylphosphine. When a cross-linking agent is used, the content thereof is preferably from 0.05% by mass to 1% by mass, and more preferably in the range of from 0.2% by mass to 0.5% by mass, with respect to the resin material. The cross-linking agent may be used singly, or in combination of two or more thereof.

Examples of release agents include inorganic particles that do not have magnetism, such as silica particles and titanium oxide particles, and waxes such as Carnauba wax, Candellila wax and ester waxes. Examples of inorganic particles not having magnetism include silica particles and titanium oxide particles, and silica particles having a surface area of from about 170 $m^2/g$ to about 300 $m^2/g$ are preferable. The content of the inorganic particles, when used, is preferably from 0.05% by mass to 0.5% by mass with respect to the resin material.

When used, the content of wax in terms of solid content is preferably from 0.05% by mass to 1.0% by mass, and more preferably from 0.2% by mass to 0.5% by mass, with respect to the resin material. Waxes may be used singly, or in combination of two or more thereof.

[5. Production of Molded Product Using Magnetic Powder Composition]

The mixture containing the magnetic powder according to the invention and a resin material may be subjected to a desired molding treatment (molding processing) suitable for the resin material, whereby a desired magnetic powder composition molded product can be obtained.

As the method employed for forming the magnetic powder composition molded product, various molding methods may be employed in accordance with the properties of the resin material to be used. Examples of molding methods include transfer molding, injection molding, extrusion molding, casting, compression molding, and dip molding. The shape of the molded product obtained by a molding method, such as those mentioned above, is not particularly limited, and the molded product has excellent superparamagnetism.

An explanation is provided below with reference to, as an example, an embodiment in which a pellet for molding is produced using an epoxy resin as a resin material.

Examples of the epoxy resin include an epoxy resin having two or more epoxy groups in one molecule thereof and having an epoxy equivalent weight of 200 or more. Specific examples thereof include bisphenol type epoxy resins, novolac type epoxy resins, halogenated epoxy resins, and glycidyl ester type epoxy resins.

Usually, the epoxy equivalent weight is preferably from 200 g/equivalent to 2000 g/equivalent, and more preferably from 200 g/equivalent to 1000 g/equivalent.

When the number of epoxy groups in one molecule is 2 or more, the epoxy resin has more improved adhesiveness to the magnetic particles. When the epoxy equivalent weight is 200 g/equivalent or more, the fluidity of the magnetic powder composition during molding is excellent, and, when the epoxy equivalent weight is 2000 g/equivalent or less, the molded product obtained has excellent packing properties.

The magnetic powder according to the invention is mixed into an epoxy resin. The method employed for the mixing is preferably a melt-kneading method. Here, the mixing may be carried out with optional addition of at least one of a curing agent, a curing accelerator, a filler, a flame retardant or the like selected in accordance with the intended use of the invention.

Although an example in which an epoxy resin is used as the resin material is described in the above embodiment, the invention is not limited thereto. Since the magnetic powder according to the invention has high affinity for resin materials, and an influence from general-use magnetic particles in terms of inhibition of curing of resin materials does not occur, the magnetic powder may be used in a magnetic powder cured product that also includes an easily moldable thermoplastic resin material.

EXAMPLE

Examples of the invention are described below. However, the invention is by no means limited by these examples. Hereinafter, "%" means "% by mass" unless specified otherwise.

Example 1

1. Removal of Dispersion Medium from Magnetic Fluid 50 mL of a magnetic fluid [EXP.12038 manufactured by Ferrotec Corporation; magnetic particles covered with a dispersant (average primary particle size: 15 nm, magnetic particle: magnetite, dispersant: sodium oleate), dispersion medium: isoparaffin] was prepared, and 50 mL of ethanol (85% aqueous solution) was added thereto, followed by thorough stirring, thereby aggregation-precipitating the magnetic particles. The precipitation time was set to 24 hours. Thereafter, ethanol was removed by filtration, to obtain an aggregated precipitate of magnetic particles.

2. Preparation of Magnetic Powder

The aggregated precipitate obtained was flattened, and placed in a convection oven having a temperature increased to 115° C. The aggregated precipitate was dried by heating in the convection oven for 8 hours, and then the aggregated precipitate was left to stand to cool for 2 hours. The magnetic powder after drying was subjected to a differential thermal analysis, as a result of which the magnetic powder was found to include 82% of inorganic component and 18% of organic component. This result confirmed that an organic component (surfactant) originating from the magnetic fluid was present on at a part of the surface of the magnetic powder.

Then the powder aggregate was pulverized into a fine powder using a mixer, to obtain a magnetic powder. The average particle size of the pulverized magnetic powder was 26 μm. For the measurement, a HELOS Particle Size Analyzer WINDOX 5 manufactured by Sympatec GmbH was used.

3. Preparation of Magnetic Powder Composition

A thermosetting resin (a bisphenol F type epoxy resin, trade name: JER4005P, softening point: 87° C., manufactured by Mitsubishi Chemical Corporation), and a curing agent (a phenolic novolac resin, trade name: TD2016, manufactured by DIC Corporation) were individually pulverized using a mixer. 100 parts by mass of the thermosetting resin, 10 parts by mass of the curing agent, and 2 parts by mass of a reaction promoter (imidazole-based, trade name: 2P4MHZ-PW, manufactured by Shikoku Chemicals Corporation) were mixed to obtain a resin composition. To the resin composition, the magnetic powder described above was added at a ratio of 80% by mass. The mixture was heated and melted using a single screw extrusion mixer under the following conditions, and formed into a sheet by rolling and cooling, and then pulverized again using a mixer, to obtain a magnetic powder composition.

<Kneading Conditions> kneading temperature: 100° C.

rotation speed: 50 r.p.m.

kneading time: 10 min

4. Production of Magnetic Powder Composition Molded Product

A 15 mm-thick molded product was produced from the magnetic powder composition described above, using an extrusion molding machine equipped with a mold for a test piece.

The produced molded product was observed with a transmission electron microscope (TEM, model name: TITAN Cubed G2 60-300, manufactured by FEI Company) under a condition with a particle acceleration voltage being 300 kV at maximum.

As a result, it was observed that the magnetic particles maintain a dispersed state without re-aggregation, as shown in FIG. 1.

5. Evaluation

The following evaluations were carried out with respect to the magnetic powder composition and the molded product. The evaluation results are indicated in Table 1.

(5-1) Appearance

The obtained molded product was visually observed so as to make an evaluation with respect to whether or not cracks are present, and whether or not surface irregularities are present.

(5-2) Fluidity

Evaluation was made according to the following evaluation criteria, based on ease of melt-kneading in an extrusion mixer.

A: Kneading can be carried out favorably.

B: There is a difficulty in kneading, but adequate kneading is still possible.

C: Fluidity is so poor as to inhibit adequate kneading.

(5-3) Magnetic Hysteresis

The M-H of the obtained molded product was measured using a vibrating sample type magnetometer (VSM) and converted to B-H, whereby the presence or absence of magnetic hysteresis is determined.

The visual observation of the appearance of the obtained molded product revealed that cracks or surface irregularities caused by separation of the magnetic powder and the resin were not observed, and the molded product had excellent appearance, as shown in the following Table 1. Further, the magnetic powder composition exhibited excellent fluidity.

In the molded product, magnetic hysteresis was not observed. Therefore, it was demonstrated that the molded product had excellent magnetic properties.

Example 2

A magnetic powder composition was prepared, a molded product was produced, and evaluations were carried out, in the same manner as in Example 1, except that the thermosetting resin (bisphenol F type epoxy resin) used in the "3. Preparation of magnetic powder composition" was replaced by 100 parts by mass of a bisphenol A type epoxy resin (trade name: JER1001, softening point: 64° C., manufactured by Mitsubishi Chemical Corporation), which is also a thermosetting resin, and that the amount of the curing agent was changed from 10 parts by mass to 21 parts by mass. The evaluation results are indicated in Table 1.

<Kneading conditions>
kneading temperature: 100° C.
rotation speed: 50 r.p.m.
kneading time: 10 min

Example 3

A magnetic powder composition was prepared, a molded product was produced, and evaluations were carried out, in the same manner as in Example 1, except that the thermosetting resin (bisphenol F type epoxy resin) used in the "3. Preparation of magnetic powder composition" was replaced by 100 parts by mass of a multifunctional epoxy resin (trade name: N-680, softening point: 80 to 90° C., manufactured by Mitsubishi Chemical Corporation), which is also a thermosetting resin, and that the amount of the curing agent was changed from 10 parts by mass to 50 parts by mass. The evaluation results are indicated in Table 1.

<Kneading conditions>
kneading temperature: 100° C.
rotation speed: 50 r.p.m.
kneading time: 10 min

Comparative Example 1

A molded product was obtained in the same manner as in Example 1, except that the magnetic fluid was directly mixed with the epoxy resin, the curing agent, and the curing promoter without performing the processes 1 and 2 performed in Example 1, and the resultant mixture was allowed to cure. However, inhibition of curing occurred, and a molded product having a hardness acceptable for a practical use could not be obtained.

Comparative Example 2

The aggregated precipitate of magnetic particles described in Example 1 was heated at 300° C. for 8 hours, thereby removing an organic component (dispersant) originated from the magnetic fluid and obtaining a magnetic powder. The magnetic powder clearly exhibited oxidization that has proceeded therein. A magnetic powder composition molded product was obtained therefrom using the method described in Example 1. The obtained magnetic powder composition molded product had a reddish-brown colored appearance. Here, the kneading conditions employed were set to be the same as those in Example 1.

The magnetic properties of the molded product were measured, as a result of which magnetic hysteresis was observed, indicating that the molded product had inferior magnetic properties.

TABLE 1

| | | | | | | | | unit: parts by mass |
|---|---|---|---|---|---|---|---|---|
| | | | Equivalent Weight | Example 1 | Example 2 | Example 3 | Comparative Example 1 | Comparative Example 2 |
| | Magnetic particle | | | Magnetic Powder | Magnetic Powder | Magnetic Powder | Magnetic Fluid | Magnetic Powder (dispersion was removed) |
| Composition | Epoxy resin | Bisphenol F 4005P | 1070 | 100 | | | 100 | 100 |
| | | Bisphenol A 1001 | 475 | | 100 | | | |
| | | Multifunctional epoxy N-680 | 210 | | | 100 | | |
| | Curing agent | TD2106 | 104 | 10 | 21 | 50 | 10 | 10 |
| Properties of Magnetic Powder Composition Molded Product | Appearance | Crack | | No | No | No | Molding was impossible | Reddish brown |
| | | Surface Irregularities | | No | No | No | | |
| | | Fluidity | | A | A | A | | A |
| | | Magnetic Hysteresis | | Not observed | Not observed | Not observed | | Observed |

Since the magnetic powder obtained in Example 1 has a surface of which at least a part thereof is covered with a dispersant, oxidation thereof as powder is prevented in the atmospheric air, and the magnetic powder can easily be handled.

In this regard, it is presumed that the magnetic material in the magnetic fluid is in the state of a superparamagnetic substance, and when a magnetic powder is prepared from the magnetic fluid as a starting material, it is conceivable that the magnetic powder prepared using the magnetic fluid as a starting material has an effect in that the magnetic powder, when in the nano-order size, does not re-aggregate event though it appears as an aggregated body, and in that the powdering occurs while maintaining the superparamagnetic state. It is presumed that, in a case in which a molded product is produced using a magnetic powder composition containing the magnetic powder according to the invention and an epoxy resin under processing conditions suitable for the epoxy resin to be used, the cured body obtained has magnetic properties comparable to those of the magnetic fluid, owing to these two effects.

In contrast, in Comparative Example 1, a molded product having a hardness acceptable for practical use could not be obtained, presumably because curing was defective due to the direct mixing of the magnetic fluid with an epoxy resin without conversion into a magnetic powder.

In Comparative Example 2, magnetic hysteresis was observed presumably because the magnetic particles were oxidized and the particle sizes of the magnetic particles became outside a range in which superparamagnetism is imparted, due to removal of the dispersant covering the magnetic particles or significant decrease in the coating amount of the dispersant caused by heat treatment of the aggregated precipitate of magnetic particles described in Example 1.

Examples 4 to 6

A magnetic powder composition was obtained, a molded product was produced, and evaluations were carried out, in the same manner as in Example 1, except that the thermosetting resin (bisphenol F type epoxy resin) used in "3. Preparation of magnetic powder composition" in Example 1 was replaced by a low density polypropylene (LDPP; trade name: NOVATEC-PP MA1 LB, manufactured by Japan Polypropylene Corporation), which is a thermoplastic resin, and that the ratio between the LDPP and the magnetic powder was changed to the ratios indicated in Table 2. The evaluation results are shown in Table 2.
<Kneading conditions>
kneading temperature: 200° C.
rotation speed: 50 r.p.m.
kneading time: 10 min Examples 7 to 8

A magnetic powder composition was prepared, a molded product was produced, and evaluations were carried out, in the same manner as in Example 1, except that the thermosetting resin (bisphenol F type epoxy resin) used in "3. Preparation of magnetic powder composition" in Example 1 was replaced by a low density polyethylene (LDPE; trade name: NOVATEC-LD ZE41 K, manufactured by Japan Polyethylene Corporation), which is a thermoplastic resin, and that the ratio between the LDPE and the magnetic powder was changed to the ratio indicated in Table 2. The evaluation results are shown in Table 2.
<Kneading conditions>
kneading temperature: 170° C.
rotation speed: 50 r.p.m.
kneading time: 10 min Similar to, for example, Example 1, cracks or surface irregularities were not recognized on the obtained molded product, and the molded product had excellent appearance, also in the case of using a thermoplastic resin as the resin material, as demonstrated in Table 2. Further, the molded product did not exhibit magnetic hysteresis, and the molded product had excellent magnetic properties.

INDUSTRIAL APPLICABILITY

A magnetic powder composition molded product obtained using the production method according to the invention has superior processability, and can be formed into various three-dimensional shapes such as a sheet-shape and a doughnut-shape. Further, the obtained molded product has superparamagnetism and has excellent magnetic properties. Therefore, the molded product is useful for various electric components and various electronic components having magnetic property requirements, and for various components such as speakers, printers, flowmeters, rotation shaft seals, active dampers, semi-active dampers, actuators, polishing elements, magnetic cameras, gel dampers, hydraulic gas compressors, dust-tight seals, manometers, tilt switches, magnetic field observers, artificial muscle actuators, journal bearings, thermal conductors, transformers, inductors, magnetic sensors, ferrite beads, antenna conductors, and various sensors, including sensors for current detection, flow rate sensors, temperature sensors, terrestrial magnetism sensors, image sensors, torque sensors, low-frequency acceleration sensors, AE rotary sensors, and vibration control sensors.

Further, utilization of such characteristics enables applications to, for example, magnetic flux regulation systems, heat storage systems, heat exchange systems, coronary microcirculation blood flow control systems, and energy recovery systems.

The disclosure of Japanese Patent Application No. 2013-149821 is herein incorporated by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A method of producing a magnetic powder composition, the method comprising:
removing a dispersion medium from a magnetic fluid consisting of magnetic particles, a surfactant and the

TABLE 2

| | | | | | | | unit: parts by mass |
|---|---|---|---|---|---|---|---|
| | | | Example 4 | Example 5 | Example 6 | Example 7 | Example 8 |
| | Magnetic Powder | | 80 | 70 | 60 | 60 | 50 |
| Resin Material | LDPP Resin | NOVATEC-PP MA1LB | 20 | 30 | 40 | — | — |
| | LDPE Resin | NOVATEC-LD ZE41K | — | — | — | 40 | 50 |
| Properties of Magnetic Powder Composition Molded Product | Appearance | Cracks | No | No | No | No | No |
| | | Surface Irregularities | No | No | No | No | No |
| | Fluidity | | A | A | A | B | A |
| | Magnetic Hysteresis | | Not observed | Not observed | Not observed | Not observed | Not observed | dispersion medium, wherein the magnetic particles comprise magnetite particles;

powdering a solid component obtained by removing the dispersion medium therefrom to form a magnetic powder comprising the magnetic particles, at least a part of the surface of one or more of the magnetic particles being covered with the surfactant;

mixing a resin material with the magnetic powder obtained through the powdering, to obtain a mixture containing the magnetic powder and the resin material; and melt-kneading the mixture, wherein an average particle size of the magnetic particles having at least a part of their surface covered with the surfactant is in a range of from 11 nm to 45 nm, and the magnetic powder exhibits superparamagnetism.

2. The method of producing a magnetic powder composition according to claim 1, wherein the powdering is a powdering without substantially applying a sliding stress.

3. The method of producing a magnetic powder composition according to claim 1, wherein the resin material is selected from thermoplastic resins or thermosetting resins.

4. The method of producing a magnetic powder composition according to claim 3, wherein the resin material is a thermoplastic resin selected from the group consisting of acrylic resins, polyethylene resins, polypropylene resins, polyvinyl chloride resins, polyvinyl acetate resins, acrylonitrile butadiene styrene copolymer resins, and fluororesins.

5. The method of producing a magnetic powder composition according to claim 3, wherein the resin material is a thermosetting resin selected from the group consisting of epoxy resins, phenol resins, melamine resins, polyimide resins, urea resins, unsaturated polyester resins, polyurethane resins, and silicone resins.

6. The method of producing a magnetic powder composition according to claim 5, wherein the method further comprises thermal curing, which thermally cures the thermosetting resin.

7. The method of producing a magnetic powder composition according to claim 5, wherein the resin material further comprises a cross-linking agent selected from imidazole-based cross-linking agents or urea-based cross-linking agents, and a content of the cross-linking agent is from 0.05% by mass to 1% by mass with respect to a mass of the resin material.

8. The method of producing a magnetic powder composition according to claim 7, wherein the method further comprises thermal curing, which thermally cures the thermosetting resin.

9. The method of producing a magnetic powder composition according to claim 3, wherein the resin material is selected from epoxy resins.

10. The method of producing a magnetic powder composition according to claim 9, wherein an epoxy equivalent weight of the epoxy resin is in a rage of from 200 g/equivalent to 2000 g/equivalent.

11. The method of producing a magnetic powder composition according to claim 10, wherein the epoxy resin is selected from the group consisting of bisphenol type epoxy resins, novolac type epoxy resins, halogenated epoxy resins, glycidyl ester type epoxy resins and a mixture thereof.

12. The method of claim 1, further comprising adsorbing a silane coupling agent on at least a portion of a surface of the magnetic particles after powdering a solid component obtained by removing the dispersion medium therefrom to form a magnetic powder.

13. The method of claim 1, wherein a content of the magnetic particles contained in the magnetic fluid is from 30% by mass to 70% by mass, in terms of solid content.

14. The method of claim 1, wherein a content of the magnetic particles contained in the magnetic fluid is from 40% by mass to 60% by mass, in terms of solid content.

* * * * *